United States Patent
Montgomery

(10) Patent No.: US 8,195,497 B2
(45) Date of Patent: Jun. 5, 2012

(54) VIRTUAL WORKSPACE FOR PROJECT MANAGEMENT COORDINATION

(75) Inventor: Christopher K. Montgomery, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 11/653,586

(22) Filed: Jan. 16, 2007

(65) Prior Publication Data

US 2008/0172625 A1   Jul. 17, 2008

(51) Int. Cl.
G06Q 10/00   (2012.01)

(52) U.S. Cl. .............. 705/7.13; 705/7.14; 705/7.15; 705/7.16; 705/7.21; 705/7.26

(58) Field of Classification Search ............ 705/7.13–16
See application file for complete search history.

(56) References Cited

U.S. PATENT DOCUMENTS

| | | | |
|---|---|---|---|
| 5,911,045 A | 6/1999 | Leyba et al. | |
| 6,073,109 A * | 6/2000 | Flores et al. | 705/7.13 |
| 6,405,364 B1 | 6/2002 | Bowman-Amuah | |
| 6,809,843 B1 | 10/2004 | Youngers | |
| 6,817,613 B2 | 11/2004 | Hasek | |
| 7,386,535 B1 * | 6/2008 | Kalucha et al. | 1/1 |
| 7,810,067 B2 * | 10/2010 | Kaelicke et al. | 717/102 |
| 2002/0065701 A1 * | 5/2002 | Kim et al. | 705/9 |
| 2002/0082950 A1 * | 6/2002 | Anderson et al. | 705/27 |
| 2002/0111824 A1 * | 8/2002 | Grainger | 705/1 |
| 2002/0184246 A1 * | 12/2002 | Shkolnik | 707/203 |
| 2003/0014409 A1 * | 1/2003 | Shukoor | 707/7 |
| 2003/0046345 A1 * | 3/2003 | Wada et al. | 709/205 |
| 2003/0120525 A1 | 6/2003 | Feser et al. | |
| 2003/0139956 A1 * | 7/2003 | Guenther et al. | 705/7 |
| 2004/0117046 A1 | 6/2004 | Colle et al. | |
| 2004/0117231 A1 | 6/2004 | Jochheim et al. | |
| 2004/0172320 A1 * | 9/2004 | Spellman et al. | 705/8 |
| 2004/0181579 A1 | 9/2004 | Huck et al. | |
| 2005/0078092 A1 | 4/2005 | Clapper | |
| 2005/0104864 A1 | 5/2005 | Zhang et al. | |
| 2005/0159968 A1 * | 7/2005 | Cozzolino | 705/1 |
| 2006/0059253 A1 * | 3/2006 | Goodman et al. | 709/223 |
| 2006/0173785 A1 | 8/2006 | Behbehani | |
| 2007/0006152 A1 * | 1/2007 | Ahmed et al. | 717/122 |
| 2007/0233545 A1 * | 10/2007 | Cala et al. | 705/9 |

OTHER PUBLICATIONS

Why Take Notes? Use the Whiteboard Capture System Li-wei He, Zicheng Liu, Zhengyou Zhang Microsoft Research, One Microsoft Way, Redmond, WA, USA {lhe, zliu, zhang}@microsoft.com Microsoft Research Technical Report: MSR-TR-2002-89.*

Klemmer, et al., "The Designer's Outpost: A Task-Centered Tangible Interface for Web Site Information Design", Date: 2000, pp. 333-334, ACM Press, New York, USA, http://delivery.acm.org/10.1145/640000/633493/p333-klemmer.pdf?key1=633493&key2=6589082611&coll=GUIDE&dl=GUIDE&CFID=3877877&CFTOKEN=28021098.

(Continued)

Primary Examiner — William Rankins

(57) ABSTRACT

A computer-implemented method for managing a project. A board having rows and columns forming a grid of cells is first created or accessed. Security rules may be assigned to each of the cells. A number of task files each containing information about one of the project tasks are then created. Authorized persons may access the board and the task files with computers linked to the host computer and place representations of selected task files within selected cells of the board. Authorized persons may view a representation of the board with the selected task files shown within the selected cells or move the selected task files from cell to cell to indicate progress made on the tasks.

25 Claims, 4 Drawing Sheets

OTHER PUBLICATIONS

Liu, et al., "A Lightweight Project-Management Environment for Small Novice Teams", http://www.cs.ualberta.ca/~stroulia/JRefleX/acse2003.pdf.

Moran, et al., "Tailorable Domain Objects as Meeting Tools for an Electronic Whiteboard", Date: 1998, http://www.fxpal.com/people/chiu/paper-mvc-CSCW98.pdf.

* cited by examiner

FIG. 4.

VIRTUAL WORKSPACE FOR PROJECT MANAGEMENT COORDINATION

BACKGROUND

Projects that require multiple people or groups of people to perform numerous project tasks typically benefit from some type of project management. For example, in software development projects, effective project management helps to assign, coordinate, and track a project's schedule, resources, and quality.

Traditional project management methodologies rely on hierarchical organizational structures, centralized command and control schemes, and relatively rigid procedures and schedules. Although traditional project management methodologies work well for some types of projects, they are often too rigid, centralized, and inefficient for many of today's software development projects and other projects that require rapid iterative development and continuous feedback from customers, testers, and others.

Agile project management methodologies have been developed to more effectively manage software development projects and other projects that cannot be effectively managed with traditional methodologies. Agile project management methodologies eschew the rigid procedures and command and control structure of traditional methodologies in favor of a more flexible approach. With agile project management methodologies, a project is viewed as a series of smaller tasks conceived and executed as the situation demands in an adaptive manner rather than as a completely pre-planned process. Agile project management methodologies typically emphasize real-time communication over written documents. Agile project management methodologies also emphasize completed tasks as the primary measure of progress rather than written reports. Because agile project management methodologies typically produce very little written documentation, some have criticized them as being unorganized and undisciplined.

To address some of the criticism of agile project management methodologies, agile-centric project management tools have been developed to more effectively organize and document the progress of an agile-managed project. Today, many agile project management tools are available, from spreadsheets to complex web sites and services. However, many agile project management practitioners dismiss these new agile-centric project management tools as unnecessary ceremony and complexity. Instead, they prefer and even evangelize the use of a large whiteboard covered in sticky notes or index cards on which information about project tasks is written. The notes or index cards are placed on the whiteboard under team members' names to indicate who has responsibility for the tasks and then moved from space to space on the whiteboard as the tasks are worked on and eventually completed. Whiteboards are successful and popular because the notes and index cards can be moved around the board with ease and provide an immediate and intuitive indication of the status of the associated tasks. The whiteboard also synchronizes all team members because everyone looks at the same board. The board also helps prevent interruptions, as most questions can be answered by looking at the board rather than bothering other team members.

Notwithstanding its simplicity and intuitiveness, whiteboards do not work well for all projects. For example, a single whiteboard is not useful for teams that work in separate offices or rooms. While some agile project management methods, such as Scrum, require that all team members work in a single room or area, this is often not feasible, especially for large projects and for companies with multiple offices. In fact, many argue that requiring a team to meet in the same place at the same time is actually not very agile.

Whiteboards also do not provide effective reporting to people remote from the board, requiring a project manager or other person to audit the board on a regular basis and create status reports that can be sent to others. It is also difficult to track the history of a task with a whiteboard, because once a note or index card is moved on the board, there is no way of knowing when it was moved or who moved it. The notes and index cards may also fall from the board and go unnoticed until the end of a project.

SUMMARY

Described herein are various technologies for providing a project management tool that incorporates all of the advantages of whiteboard project management methods and more centralized management tools without the disadvantages of either.

Embodiments of the technologies described herein can be implemented in hardware, software, firmware, or a combination thereof. One embodiment is a computer-implemented method for managing a project in which a workspace is created to allow project team members and managers to quickly, easily, and intuitively track project tasks and schedules.

Project team members or others first access or create a simulated board or space having rows and columns forming a grid of cells or sub-spaces. The simulated board may have the appearance of a whiteboard, corkboard, or any other space having rows and columns forming a grid. A simulated board may be created from "scratch" for each project to be managed, or boards may be created from a template.

Security rules may be assigned to each of the cells within the board to govern access to the cells, and some of the cells may have different security rules than other cells. This allows a project manager or other person to assign different access rules to different cells and to assign different access rights to different team members.

The team members, managers, or others then access or create a number of task files each containing information about one of the project tasks. The task files may be linked to additional information not contained in the task files. For example, a task file for a licensing review task may have a link to the related license agreement.

The board and task files are then stored in computer-accessible memory such as memory resident in or accessible by a host computer. Project team members or others may then access the board and the task files with computers linked to the host computer and place representations of selected task files within selected cells of the board. For example, task files for tasks to be performed by a particular member may be placed in cells assigned to that member.

Team members or other authorized persons may access the host computer to view a representation of the board with the selected task files shown within the selected cells. Team members or others who have permission may also move the selected task files from cell to cell to indicate progress made on the tasks associated with the selected task files. The representation of the board and the task files provides immediate and intuitive reporting on the progress of the project.

Reports or alerts may also be provided to communicate activities on the board. For example, an alert or report may be provided when a user associates a task file with a cell or moves the task file to another cell. Similarly, a record may be kept each time a task file is accessed by a team member, assigned to a cell, or moved to another cell.

The embodiments described herein may be used with any project management methodology including agile and traditional methodologies. Moreover, embodiments may be used to manage any project, including but not limited to a software development project, a hardware development project, a sporting event, a fund raiser, a civic event, a political event, a social event, a religious event, and a school event.

These and other important features are described more fully in the detailed description below.

BRIEF DESCRIPTION OF THE DRAWING FIGURES

Embodiments are described in detail below with reference to the attached drawing figures, wherein:

FIG. 4 is an exemplary computer screen display depicting a workspace;

Figure 1:
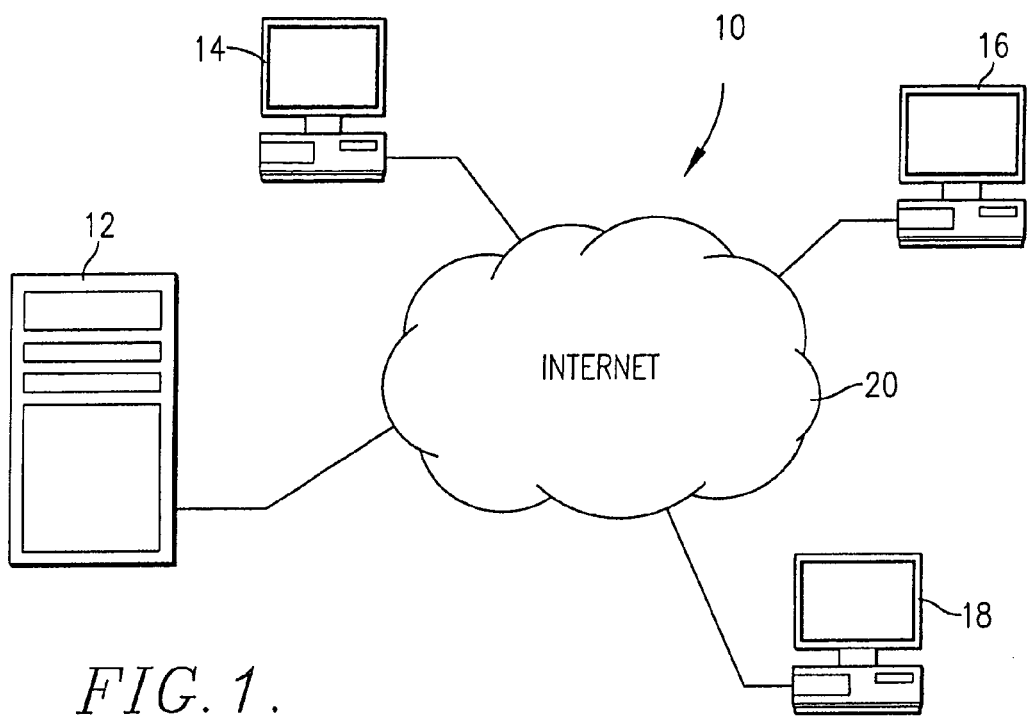
FIG. 1 is a schematic diagram of computer and communications equipment which may be used to implement exemplary embodiments.

The drawing figures do not limit the claims to the specific embodiments disclosed and described herein. The drawings are not necessarily to scale.

DETAILED DESCRIPTION

The following detailed description references the accompanying drawings that illustrate specific embodiments which can be practiced. The embodiments are intended to describe features and technologies in sufficient detail to enable those skilled in the art to practice the embodiments. Other embodiments can be utilized and changes can be made without departing from the scope of the claims. The following detailed description is, therefore, not to be taken in a limiting sense. The scope of the embodiments is defined only by the appended claims, along with the full scope of equivalents to which such claims are entitled.

Embodiments can be implemented in hardware, software, firmware, or a combination thereof. For example, embodiments may be implemented with one or more computer programs that operate computer equipment for performing or enabling the steps described herein. As illustrated in FIG. 1, one specific embodiment is implemented with computer equipment 10 having a client/server architecture consisting of a host computer 12 and a plurality of computing devices 14, 16, 18 that may access the host computer 12 via a communications network 20. The computer program or programs in this client/server embodiment may utilize, for example, Microsoft® SharePoint®, Visual Studio® Team System/Team Foundation, and other server technologies.

Figure 2:
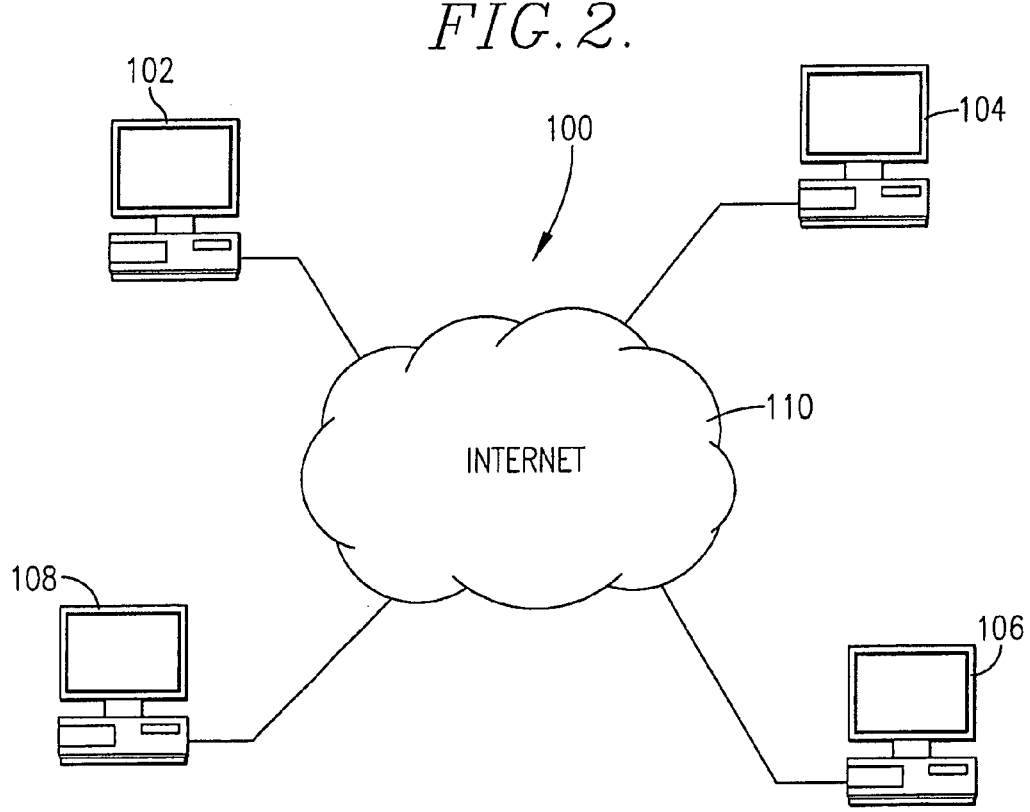
FIG. 2 is a schematic diagram of other computer and communications equipment which may be used to implement exemplary embodiments.

Another embodiment illustrated in FIG. 2 may use computer equipment 100 having peer-to-peer network architecture consisting of several computing devices 102, 104, 106, 108 that operate as peer nodes connected via a communications network 110. The computer program or programs in this peer-to-peer embodiment may utilize, for example, Groove Workspace™ or similar technologies.

The computer programs and equipment illustrated and described herein are merely examples of programs and equipment that may be used to implement embodiments and may be replaced with other programs and computer equipment without departing from the scope of the claims. For purposes of fully describing exemplary embodiments, the following disclosure refers specifically to the client/server architecture of FIG. 1, but other computer architectures may be used as well.

The host computer 12 serves as a repository for data and programs used to implement certain features and steps as described in more detail below. The host computer 12 may be any computing device such as a server or network type computer running any known network operating system. The host computer 12 may be connected to other computing devices that serve as a firewall to prevent tampering with information stored on or accessible by the host computer 12 and to other computing devices operated by an administrator of the host. The host computer 12 may include conventional web hosting operating software, an Internet connection such as a modem, DSL converter or ISDN converter, and is assigned a URL so that it can be accessed via the Internet in a conventional manner.

The computing devices 14, 16, 18 may be any types of devices that permit access to the host computer 12 via the communications network 20. For example, the computing devices may include personal computers; handheld personal assistants; or even Internet appliances that are specifically designed for accessing the Internet. Each computing device preferably includes or can access a conventional Internet connection such as a modem, DSL converter, or ISDN converter and a web browser that permits the computing device to access the Internet.

The communications network 20 is preferably the Internet but may be any other conventional communications network such as a local area network, a wide area network, a wireless network, or an intranet.

The computer program or programs are stored in or on computer-readable medium residing on or accessible by the host computer 12 and/or the computing devices 14, 16, 18. The computer programs may each comprise executable instructions for implementing logical functions in the host computer 12 and/or computing devices 14, 16, 18. The computer programs can be embodied in any computer-readable medium for use by or in connection with an instruction execution system, apparatus, or device, such as the host computer 12 and the computing devices 14, 16, 18. In the context of this application, a "computer-readable medium" can be any means that can contain, store, communicate, or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The above-described computer and communications equipment and computer programs enable a computer-implemented method for managing a project in which an on-line whiteboard or other project management workspace is created to allow project team members and managers to quickly, easily, and intuitively track project tasks and schedules. In general, project team members or others first access or create a board or other space having rows and columns forming a grid of cells or sub-spaces. The board may be a whiteboard, corkboard, or any other space having rows and columns forming a grid. A board may be created from "scratch" for each project to be managed, or boards may be created from a template.

Security rules may be assigned to each of the cells within the board to govern access to the cells, and some of the cells may have different security rules than other cells. This allows a project manager or other person to assign different access rules to different cells and to assign different access rights to different team members.

The team members, managers, or others then access or create a number of task files each containing information about one of the project tasks. The task files may be linked to additional information not contained in the task files. For example, a task file for a licensing review task may have a link to the related license agreement.

The board and task files are then stored in computer-accessible memory such as memory resident in or accessible by the host computer 12. Project team members or others may then access the board and the task files with one of the computers 14, 16, 18 and place representations of selected task files within selected cells of the board. For example, task files for tasks to be performed by a particular member may be placed in cells assigned to that member.

At any time, team members or other authorized persons may access the host computer 12 to view a representation of the board with the selected task files shown within the selected cells. Team members or others may also move the selected task files from cell to cell to indicate progress made on the tasks associated with the selected task files to provide an immediate and intuitive visualization of the progress of the project. An alert or report may be provided when a user associates a task file with a cell or moves the task file to another cell. Similarly, a record may be kept each time the task file is accessed by the user, assigned to a cell, or moved to another cell.

The technologies described herein may be used with any project management methodology including agile and traditional methodologies. Moreover, the technologies may be used to manage any project, including but not limited to a software development project, a hardware development project, a sporting event, a fund raiser, a civic event, a political event, a social event, a religious event, and a school event.

Figure 3:
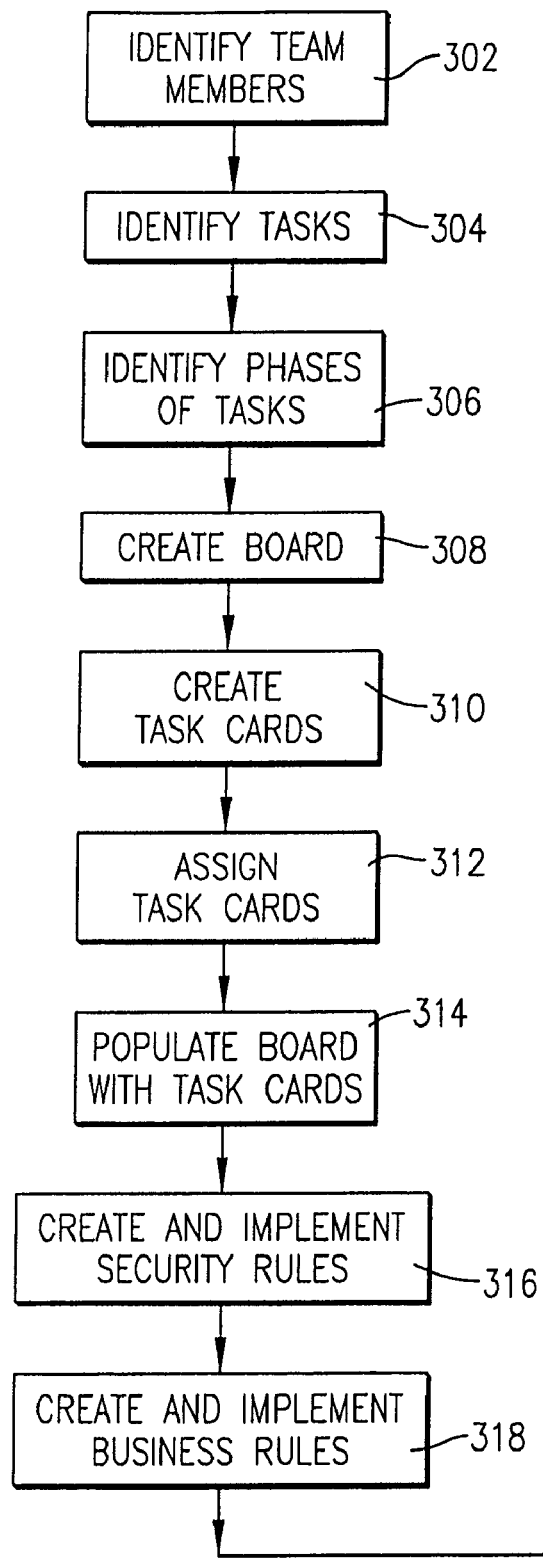
FIG. 3 is a flow diagram depicting certain steps of a method embodiment.
Figure 3:
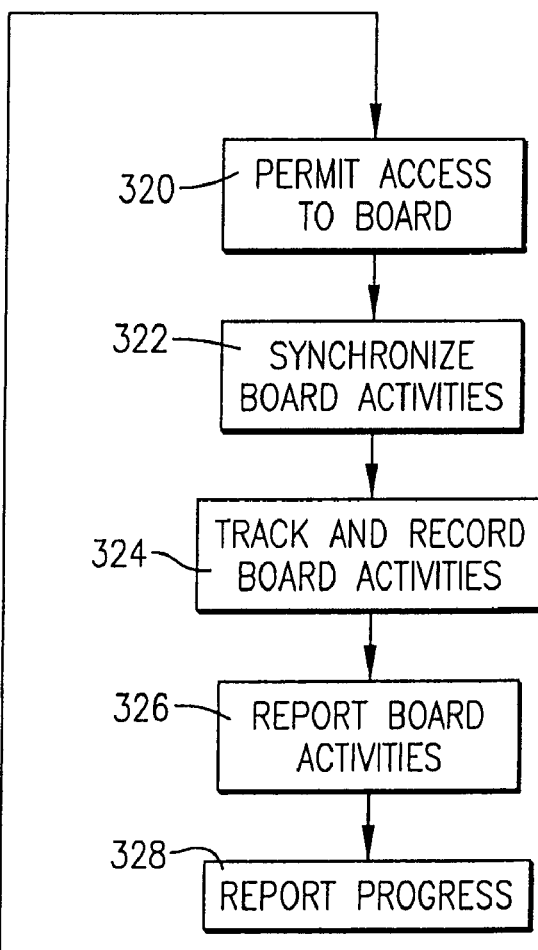

The flow chart of FIG. 3 shows the functionality and operation of an exemplary implementation in more detail. In this regard, some of the blocks of the flow chart may represent a code segment, module segment or portion of code of computer programs which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The exemplary implementation may begin when team members for a project to be managed are identified or otherwise selected as depicted by step 302. For example, a software development project may include team members: Brent, Janis, Team A (a group of several people), and Chris. The particular number of team members may vary from project to project.

Tasks that must be performed and completed in order to finish the project are then identified as depicted by step 304.

Continuing with the software development project example, the tasks may be: Analyze Patents; Determine Market Potential; Create Subroutine X; Create Subroutine Y; etc.; however, any tasks for any project may be identified. Moreover, each of the identified tasks may include numerous sub-tasks, instructions and details. For example, the Create Subroutine X task may include the sub-tasks of: Study Requirements; Design Architecture; Develop Code; Debug Code; Test Code; and Implement Code. The particular number of tasks, and the information associated with each task, may vary from project to project.

Phases for the tasks are then identified or otherwise selected as depicted in step 306. As used herein, "phases" may mean steps that must be performed to complete a task or time intervals for completion of the tasks. For example, each of the tasks of the exemplary software development project may include the phases: Analysis; Build; Test; and Acceptance. Additional phases may include Training, Documentation, Budgeting, etc. Again, the particular number and type of phases may vary from project to project.

Using the information from the steps above, a workspace or board is then accessed or created as depicted by step 308. When displayed, the board may have the appearance of a whiteboard, corkboard, or other workspace used to receive notes and cards. The space or board may be created using a program stored on or accessible by the host computer and having a graphical user interface (GUI).

Figure 4:
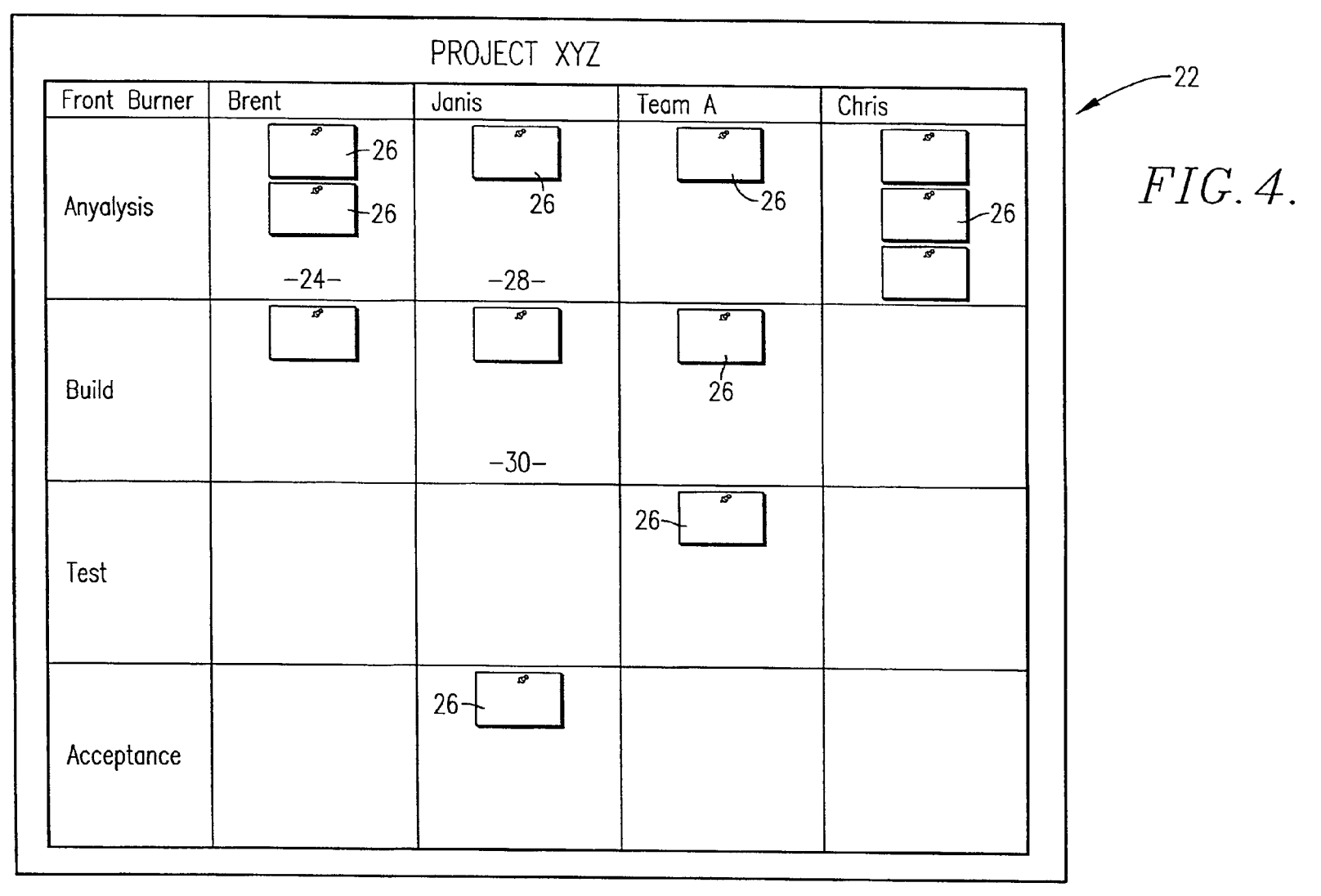

The space or board which is accessed or created may have a number of rows and columns forming a number of cells or sub-spaces 24, 28, 30. The rows may be associated with the phases mentioned above and the columns may be associated with the team members, or vice versa. The cells or sub-spaces 24, 28, 30 defined by the rows and columns are configured for receiving the task files as discussed below. For example, FIG. 4 illustrates an exemplary board 22 with rows corresponding to the phases of the tasks and with columns corresponding to the team members. The rows and columns can be reversed so that the rows correspond to the team members and the columns correspond to the phases of the tasks. Each of the cells on the board corresponds to one team member and one phase of a task. For example, the team member for cell 24 is Brent and the phase is "Analysis". The space or board may also be assigned a URL so it can be accessed by one of the computing devices 14, 16, 18 via the Internet.

Figure 5:
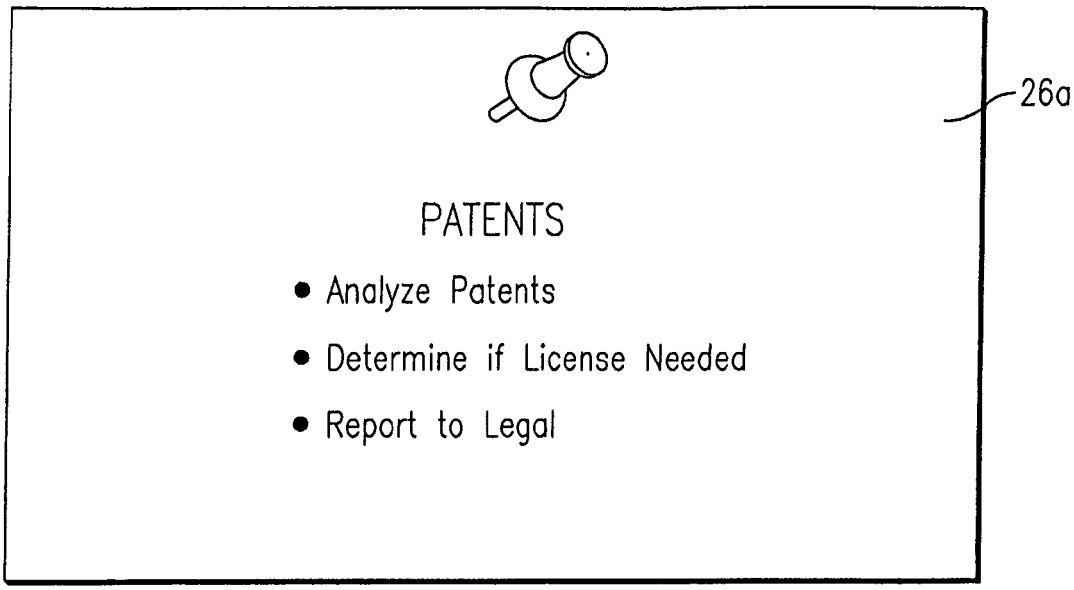
FIG. 5 is an exemplary screen display depicting a task file which may be placed on or otherwise associated with the workspace of FIG. 4.
Figure 6:
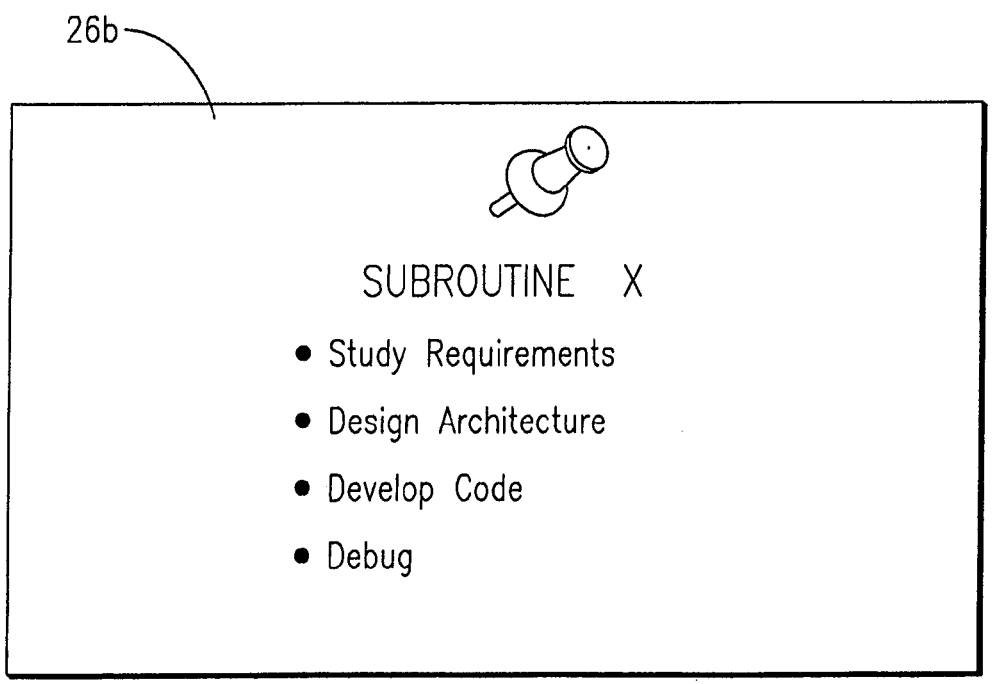
FIG. 6 is an exemplary screen display of another task file.

Task files 26 are then accessed or created using a program stored on or accessible by the host computer as depicted in step 310. A task file may be accessed or created for every task of the project or selected tasks only. The task files may also be created in advance and accessed from memory in this step. Using the exemplary tasks identified with step 304 above, task files are created for the tasks of Analyze Patents; Determine Market Potential; Create Subroutine X; and Create Subroutine Y. Each task file may include an explanation of the task that must be performed as well as instructions, a list of sub-tasks, etc. related to the task. When displayed on the board as described below, the task files may each have the appearance of a card or note as shown in FIGS. 4, 5 and 6.

Each of the task files 26 may be linked, via a hypertext link or similar technology, to additional information not contained in the task files. This additional information may be stored in memory of the host computer 12 or may be stored in external computers and accessed via the Internet or other communications network. For example, a task file for a licensing review task may have a link to the related license agreement, patents, or other documents stored in the host computer 12 memory or the memory of any of the computing devices 14, 16, 18.

The task files may also indicate the relative importance or time sensitivity of the associated tasks. For example, higher priority tasks may include a designation such as "High Priority" or may be color-coded or otherwise marked.

Once the task files 26 have been accessed or created, at least some of the tasks are assigned to the team members by associating the task files with selected cells 24, 28, 30 on the board 22 as depicted by steps 312 and 314. For example, the task Analyze Patents may be assigned to Brent by moving or otherwise associating the task file 26a depicted in FIG. 5 to the cell 24 in FIG. 4. These steps are repeated, although not necessarily at the same time or in any particular order, until all the tasks have been assigned to the team members.

At any time before or after the board 22 or other space is created, security rules may be created and implemented as depicted in Step 316. For example, a project manager may authorize any team member to move a task file to the cells within the first three rows of the board, but only certain team members to move or otherwise associate a task file to any of the cells in the fourth row (Acceptance). Similarly, certain team members may be given the authority to write additional information to the task files, whereas other team members may have read-only capabilities. The security rules may be implemented and enforced on a cell-by-cell basis as described in detail in U.S. Pat. No. 7,127,461, hereby incorporated into the present application by reference, or by any other security scheme.

Business rules for protecting change of status and ownership of the task files 26 may also be created as depicted in step 318. For example, the host computer 12 or any other computer on which the board 22 is stored may prevent access and movement of a task file while an authorized team member is writing information to the file. This may be done, for example, by permitting only one team member or other user to access a selected task file at a time. Similarly, rules may prevent team members from completely removing a task file from the board (and thus indicating that the task has been completed) until a project manager has authorized this action. This may be done, for example, by programming the host computer 12 to prevent removal of a task file from the board until a code or password is entered by the project manager.

Once the board 22 has been populated with the task files 26, team members, managers, and others may access the board as depicted in step 320. The board may be accessed with one of the computing devices 14, 16, 18 by entering the board's URL into a browser to connect to the host computer via the communications network 20. Appropriate log-in and password procedures may be implemented to ensure that only authorized persons can access the board.

The board 22 may be accessed for several purposes. For example, a project manager or anyone else may access the board 22 to add or otherwise associate additional task files with the cells or sub-spaces as described above. The board may also be accessed to determine the status of the tasks associated with the task files 26. If the board shows that all of the task files are still positioned within or otherwise associated with the first row of cells on the board (the Analysis phase), the project manager can quickly ascertain that the project is still in a very early stage. Conversely, if all of the task files have been removed from the board (thus indicating their completion), the project manger can ascertain that the project is essentially completed. The project manager or other authorized person could also mark or otherwise indicate the completion of the tasks on the task files so that the task files would not have to be removed from the board to indicate completion.

The board 22 may also be accessed to move one of the task files from one cell to another to indicate completion of a task phase. For example, a user may move the task file 26b shown in FIG. 6 from the cell 28 to the cell 30 to indicate that Subroutine X has been fully analyzed and now must be built by writing the appropriate code.

The board may also be accessed to obtain more information about one of the tasks. For example, a team member who wishes to learn more about the task associated with the task card 26a illustrated in FIG. 5 may access the board and click on a link within the task file to view a document or file linked to the task file such as the patents being reviewed, any agreements or letters associated with the patents, etc.

A team member, manager, or other person may also access the board to write information to one of the task files. For this purpose, adapters may be provided to enable read and write capabilities with commonly-used tools such as Microsoft® Excel, Project, or PowerPoint®.

As team members and other authorized persons access the board 22, move the task files 26, or perform other functions described herein, the host computer 12 or other computer on which the board is stored synchronizes the board activities as depicted in step 322. The program or programs which enable the board may, for example, ensure that only one team member at a time can access or move a task file.

Similarly, the host computer 12 or other computer on which the board is stored tracks and records board activities as depicted in step 324. The host computer may, for example, record in a database accessible by the host computer the date and time each task file 26 is created, accessed, moved, or written to and may record the identity of the person who performs these activities. This information may also be stored in or otherwise associated with the task file so that it may be viewed by accessing the board. For example, each task file may include a "history" link which may be clicked on to display the recorded information mentioned above and possibly other information.

The host computer 12 or other computer on which the board is stored may also provide alerts and reports as depicted in step 326. For example, the program or programs which enable the board 22 may instruct the host computer to automatically send an e-mail message or other alert to a project manager each time a task file is moved from one cell to another. A message or alert may also be sent if a task file has not been accessed or moved within a pre-determined amount of time (for example, five days) so that the project manager may investigate why no actions have been taken on the task associated with the task file. Alerts may also be posted on or alongside the board. For example, an alert such as "Task XYZ is Behind Schedule" may be superimposed over the board or displayed alongside the board if the Task XYZ has a target completion date which has passed.

Similarly, the host computer 12 or other computer on which the board is stored may also provide progress reports as depicted in step 328. The progress reports may indicate any information relevant to timing or scheduling of the project such as the percentage completion of each task and the project as a whole. For example, when the project is first begun and none of the task files have been associated with any of the cells on the board, the host computer may send a report to a project manager indicating that the tasks and the project as a whole are 0% complete. Conversely, once all of the task files have been removed from the board, a progress report may be sent indicating that the tasks and the project as a whole are 100% complete. The various phases of the tasks may be weighted by the project manager or other authorized person during board creation to provide more precise "percentage complete" reports. For example, a particular task may have a 20% weighting for phase 1 (Analysis), 40% weighting for phase 2 (Build), a 30% weighting for phase 3 (Test), and a 10% weighting for phase 4 (Acceptance). With these weightings, the report will indicate that the task is 20% done after the Analysis phase is completed, 60% done after both the Analysis and Build phases are completed, etc. Progress numbers may also be displayed directly on the board 22. For example, each task file 26 may include a "percent complete" indication and the entire board may include a similar "percent complete" indication which is an average or composite of the "percent complete" numbers for all of the task files. The host computer may also support the printing of snapshots of the board.

Although only one board is created and displayed in some embodiments, other embodiments may display representations of several boards. For example, the tasks of a project may be divided into "front burner" and "back burner" categories to indicate the relative importance or time sensitivity of the tasks. In this case, both a front burner and a back burner board may be created and displayed so that authorized users can access and view both boards. A "Complete Board" may also be provided for receiving task files once the corresponding tasks are completed.

Although features and aspects of technologies have been described with reference to the embodiments illustrated in the attached drawing figures, it is noted that equivalents may be employed and substitutions made herein without departing from the scope of the claims.

Having thus described embodiments of the technologies, what is claimed as new and desired to be protected by Letters Patent includes the following:

1. A computer-implemented method for managing a project having a number of tasks, the method comprising:
    creating a board having rows and columns forming a grid of cells such that the rows or the columns correspond to respective phases of the tasks;
    assigning security rules to each of the cells to govern access to the cells;
    creating a number of task files each containing information about one of the tasks;
    storing the board and task files in computer-accessible memory;
    accessing the board and the task files and placing a representation of a selected task file that contains information about a specified task within a selected cell that corresponds to a first phase of the specified task, using at least one computing device;
    displaying a representation of the board with the selected task file shown within the selected cell; and
    moving the selected task file from the selected cell to another cell that corresponds to a second phase of the specified task to indicate progress made on the specified task.

2. The method as set forth in claim 1, wherein the rows correspond to the respective phases of the tasks and the columns correspond to people or groups who will be performing the tasks.

3. The method as set forth in claim 1, further including the step of providing an alert when the representation of the selected task file is placed within the selected cell or when the selected task file is moved from the selected cell.

4. The method as set forth in claim 1, further including the step of linking the task files to additional information.

5. The method as set forth in claim 1, further including the step of recording each time the task files are accessed, when the representation of the selected task file is placed within the selected cell, and when the selected task file is moved from the selected cell.

6. The method as set forth in claim 1, further comprising:
    sending a message or an alert in response to a task file not being accessed within a pre-determined amount of time.

7. The method as set forth in claim 1, further comprising:
    sending a message or an alert in response to a task file not being moved within a pre-determined amount of time.

8. The method as set forth in claim 1, further comprising:
    weighting the phases such that at least one of the phases has a weighting that is different from others of the phases.

9. The method as set forth in claim 1, further comprising:
    weighting the phases such that the first phase of the specified task has a different weighting than the second phase of the specified task; and
    providing a progress report that indicates a percentage of completion of the specified task based on the weightings of the first and second phases of the specified task.

10. A computer-readable storage medium having a computer program stored thereon for managing a project having a number of tasks, the computer program comprising:
    a code segment for creating a board having rows and columns forming a grid of cells such that the rows or the columns correspond to respective phases of the tasks;
    a code segment for creating a number of task files each containing information about one of the tasks;
    a code segment for permitting users to access the board and the task files and to place a representation of a selected task file that contains information about a specified task within a selected cell that corresponds to a first phase of the specified task;
    a code segment for generating a viewable representation of the board with the representation of the selected task file shown within the selected cell; and
    a code segment for permitting the users to move the representation of the selected task file from the selected cell to another cell that corresponds to a second phase of the specified task to indicate progress made on the specified task.

11. The computer-readable storage medium as set forth in claim 10, wherein the computer program further comprises:
    a code segment for assigning security rules to each of the cells to govern access to the cells.

12. The computer-readable storage medium as set forth in claim 10, wherein the computer program further comprises:
    a code segment for providing an alert when the users place the selected task file within the selected cell or move the representation of the selected task file from the selected cell.

13. The computer-readable storage medium as set forth in claim 10, wherein the computer program further comprises:
    a code segment for recording each time the board and the task files are accessed.

14. The computer-readable storage medium as set forth in claim 10, wherein the computer program further comprises:
    a code segment for sending a message or an alert in response to a task file not being accessed or moved within a pre-determined amount of time.

15. The computer-readable storage medium as set forth in claim 10, wherein the computer program further comprises:
    a code segment for weighting the phases such that at least one of the phases has a weighting that is different from others of the phases.

16. The computer-readable storage medium as set forth in claim 10, wherein the computer program further comprises:

a code segment for weighting the phases such that the first phase of the specified task has a different weighting than the second phase of the specified task; and a code segment for providing a progress report that indicates a percentage of completion of the specified task based on the weightings of the first and second phases of the specified task.

17. A system comprising:

a first module that creates a board having rows and columns that form a grid of cells such that the rows or the columns correspond to respective phases of the tasks;

a second module that assigns security rules to each of the cells to govern access to the cells;

a third module that creates a plurality of task files, each task file containing information about a respective task of a plurality of tasks;

a fourth module that places a representation of a selected task file that contains information about a specified task in a selected cell that corresponds to a first phase of the specified task;

a fifth module that displays a representation of the board with the selected task file shown in the selected cell;

a sixth module that moves the selected task file from the selected cell to another cell that corresponds to a second phase of the specified task to indicate progress made on the specified task; and a computer-accessible memory that stores the board and the plurality of task files.

18. The system as set forth in claim 17, wherein the rows correspond to the respective phases of the tasks and the columns correspond to people or groups who are to perform the tasks.

19. The system as set forth in claim 17, further comprising:
a seventh module that provides an alert in response to placement of the representation of the selected task file in the selected cell or in response to movement of the selected task file from the selected cell.

20. The system as set forth in claim 17, further comprising:
a seventh module that links the task files to additional information.

21. The system as set forth in claim 17, further comprising:
a seventh module that records each time the task files are accessed, when the representation of the selected task file is placed within the selected cell, and when the selected task file is moved from the selected cell.

22. The system as set forth in claim 17, further comprising:
a seventh module that sends a message or an alert in response to a task file not being accessed within a predetermined amount of time.

23. The system as set forth in claim 17, further comprising:
a seventh module that sends a message or an alert in response to a task file not being moved within a predetermined amount of time.

24. The system as set forth in claim 17, further comprising:
a seventh module that weights the phases such that at least one of the phases has a weighting that is different from others of the phases.

25. The system as set forth in claim 17, further comprising:
a seventh module that weights the phases such that the first phase of the specified task has a different weighting than the second phase of the specified task; and an eighth module that provides a progress report that indicates a percentage of completion of the specified task based on the weightings of the first and second phases of the specified task.

* * * * *